United States Patent [19]

Nakao et al.

[11] Patent Number: 4,931,862
[45] Date of Patent: Jun. 5, 1990

[54] FILTER CHANGE-OVER MECHANISM FOR USE IN COLOR IMAGE READING APPARATUS

[75] Inventors: Motokazu Nakao, Sakurai; Tomotarou Tojo, Nara; Kenji Tanaka, Uji, all of Japan

[73] Assignee: Sharp Kabushiki Kaisha, Osaka, Japan

[21] Appl. No.: 271,326

[22] Filed: Nov. 15, 1988

[30] Foreign Application Priority Data

Nov. 19, 1987 [JP] Japan .......................... 62-176746[U]

[51] Int. Cl.$^5$ .......................... H04N 1/028; H04N 1/46
[52] U.S. Cl. .......................... 358/75; 358/78
[58] Field of Search .......................... 358/75, 78

[56] References Cited

FOREIGN PATENT DOCUMENTS

| 58-43658 | 3/1983 | Japan . | |
| 59-226556 | 12/1984 | Japan | 358/75 |
| 60-178768 | 9/1985 | Japan | 358/75 |
| 60-206361 | 10/1985 | Japan . | |
| 61-84150 | 4/1986 | Japan . | |

Primary Examiner—James J. Groody
Assistant Examiner—Randall S. Syihla
Attorney, Agent, or Firm—Birch, Stewart, Kolasch & Birch

[57] ABSTRACT

A filter change-over mechanism for use in a color image reading apparatus, in which filters in a plurality of colors are arranged to be changed over through utilization of a scanning function of an image reading unit, thus making it unnecessary to provide a driving source exclusive for the filter change-over or a complicated change-over mechanism, and accordingly, the image reading apparatus may be constructed to be compact in size and light in weight, and also presented at low cost owing to reduction of parts required.

11 Claims, 3 Drawing Sheets

FILTER CHANGE-OVER MECHANISM FOR USE IN COLOR IMAGE READING APPARATUS

BACKGROUND OF THE INVENTION

The present invention generally relates to a color image reading apparatus so arranged that, by projecting light onto an original document, reflected light from the surface of the original document is subjected to color separation by filters in a plurality of colors. It is subsequently photo-electrically converted by a solid state image pick-up element or the like, and more particularly, to a change-over mechanism for filters in a plurality of colors for use in such color image reading apparatus.

Conventionally, as disclosed, for example, in Japanese Patent Laid-Open Publication No. 58-43658, there existed an image reading apparatus of a stationary original document type in which an image reading optical system is formed in a unit for scanning. The device scanned over the surface of an original document in a manner that, not only a sheet-like original document, but a book-type original document (e.g. a book) could be read as well.

Meanwhile, with regard to a color image reading apparatus for reading an original document in color, there has conventionally existed an arrangement in which light projected onto, and reflected from, an original document was subjected to color separation by displacing filters. The filters were displaced in a plurality of colors vertically, laterally, or through rotation as disclosed, for example, in Japanese Patent Laid-Open Publication No. 60-206361 or No. 61-84150.

However, in the prior art techniques as referred to above, a complicated change-over mechanism was required in addition to a requirement for an exclusive driving source the filter change-over mechanism in order to efficiently change over the filters of a plurality of colors. Further, for example, when such a filter change-over mechanism is incorporated into the image reading apparatus of the stationary original document type as previously referred to, special mechanisms for supporting the image reading unit and a large driving source for the driving the filter change-over mechanism. Thus, thereof are required the image reading unit becomes larger in size and heavier in weight.

SUMMARY OF THE INVENTION

Accordingly, an essential object of the present invention is to provide a filter change-over mechanism for use in a color image reading apparatus, which is compact in size and light in weight.

Another object of the present invention is to provide a filter change-over mechanism of the above described type, which is simple in construction, stable, and functions with a high reliability.

In accomplishing these and other objects, according to one preferred embodiment of the present invention, a filter change-over mechanism is provided for use in a color image reading apparatus (1) arranged to be displaced for scanning along an original document; an image reading unit (4) in which filters (14B, 14G, 14R) in a plurality of colors for subjecting light from a light source (7) as reflected by an original document, to color separation, are disposed in front of an image pick-up element (12). The filter change-over mechanism includes a contact member (26) provided on the color image reading apparatus (1) for contacting a specific part of the image reading unit (4) when the image reading unit is positioned at a predetermined position in a scanning region of said image reading unit. It further includes a filter change-over device provided at the specific part of the image reading unit (4) for changing over the filters, through contact thereof, with the contact member (26).

By the arrangement of the present invention as described above, it is not necessary to provide an exclusive driving source for the change-over of the filters, and the change-over function of the filters may be readily effected by displacing the image reading unit at a predetermined position for scanning.

BRIEF DESCRIPTION OF THE DRAWINGS

These and other objects and features of the present invention will become clear from the following description taken in conjunction with the preferred embodiments thereof with reference to the accompanying drawings, in which.

Figure 4:
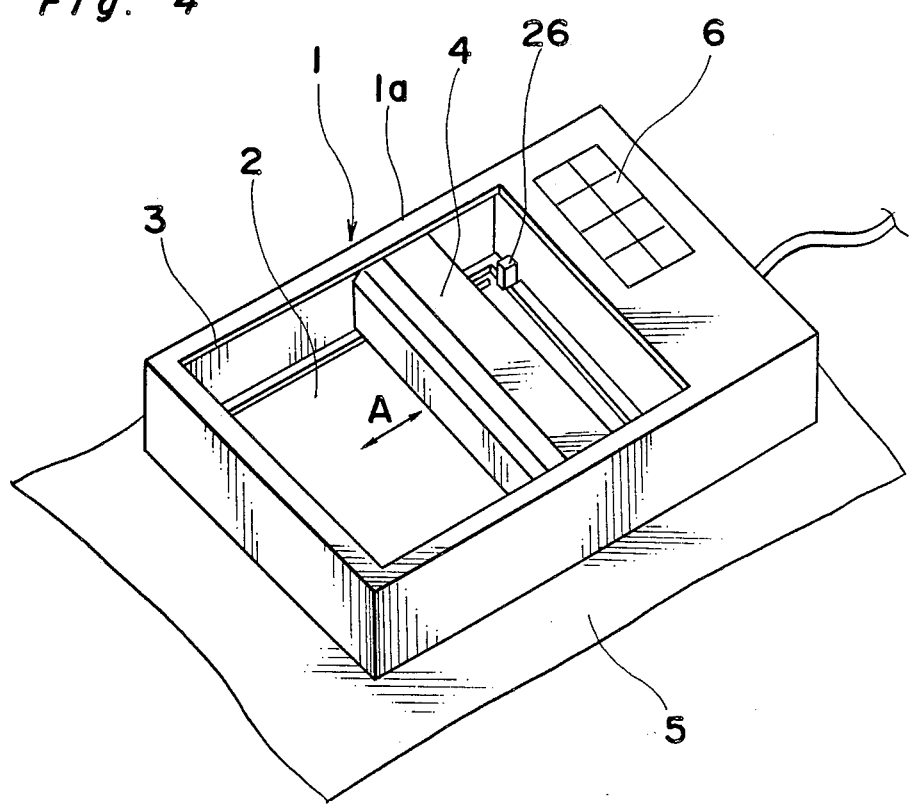
Figure 3A:
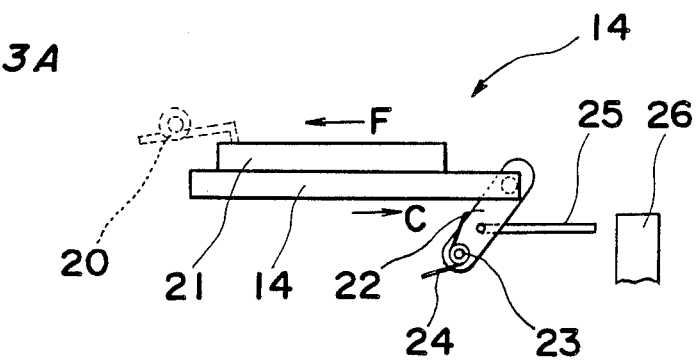
FIG. 3A is a side elevational view showing of on an enlarged scale, a filter panel with a filter change-over device employed in the arrangement of FIG. 1.
Figure 3B:
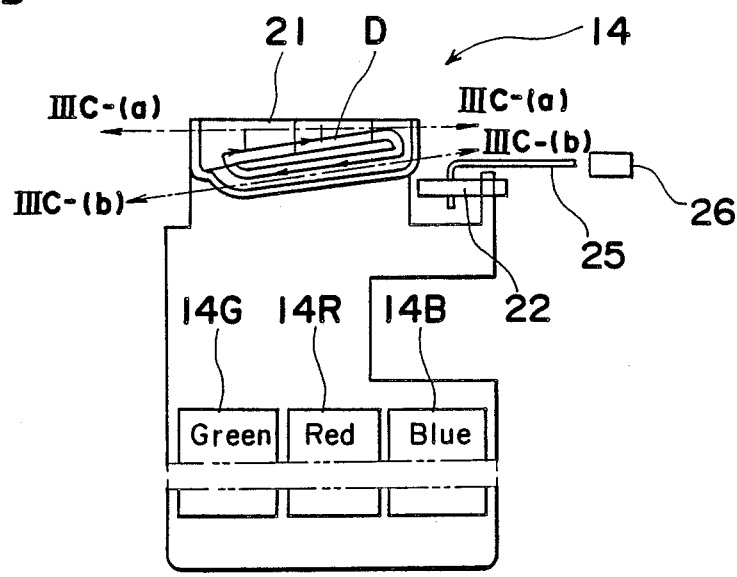
FIG. 3B is a top plan view of the filter panel of FIG. 3A.
Figure 3C:
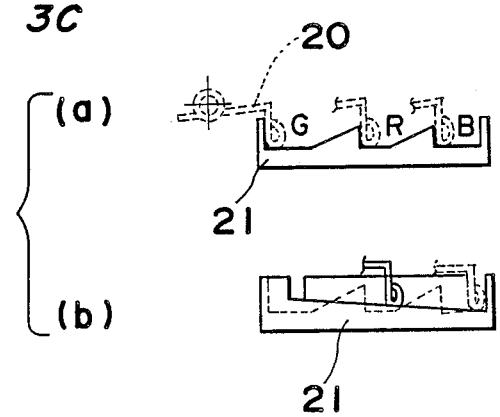

View (a) of FIG. 3C is a cross section, on an enlarged scale, of a filter positioning block taken along the line IIIC-(a)—IIIC-(a) of FIG. 3B;

View (b) of FIG. 3C is a cross section, on an enlarged scale, of a filter positioning block taken along the line IIIC-(b)—IIIC-(b) of FIG. 3B; and FIG. 4 is a perspective view of a color image reading apparatus to which a filter change-over mechanism according to the present invention may be applied.

DETAILED DESCRIPTION OF THE INVENTION

Before the description of the present invention proceeds, it is to be noted that like parts are designated by like reference numerals throughout the accompanying drawings.

Referring now to the drawings, there is shown in FIG. 4, a color image reading apparatus 1, of a stationary original document type, to which a filter change-over mechanism according to the present invention may be applied. It includes a color image reading apparatus main body 1a having a window portion 3 provided with transparent plates 2 on its upper and lower surfaces. It further includes an image reading unit 4 arranged to be driven for scanning within the window portion 3 of the main body 1a in directions indicated by arrows A so as to read an image of an original document 5 disposed thereunder. Finally, control switches 6 are provided adjacent to one edge of the main body 1a for controlling the functioning of the apparatus 1.

Figure 1:
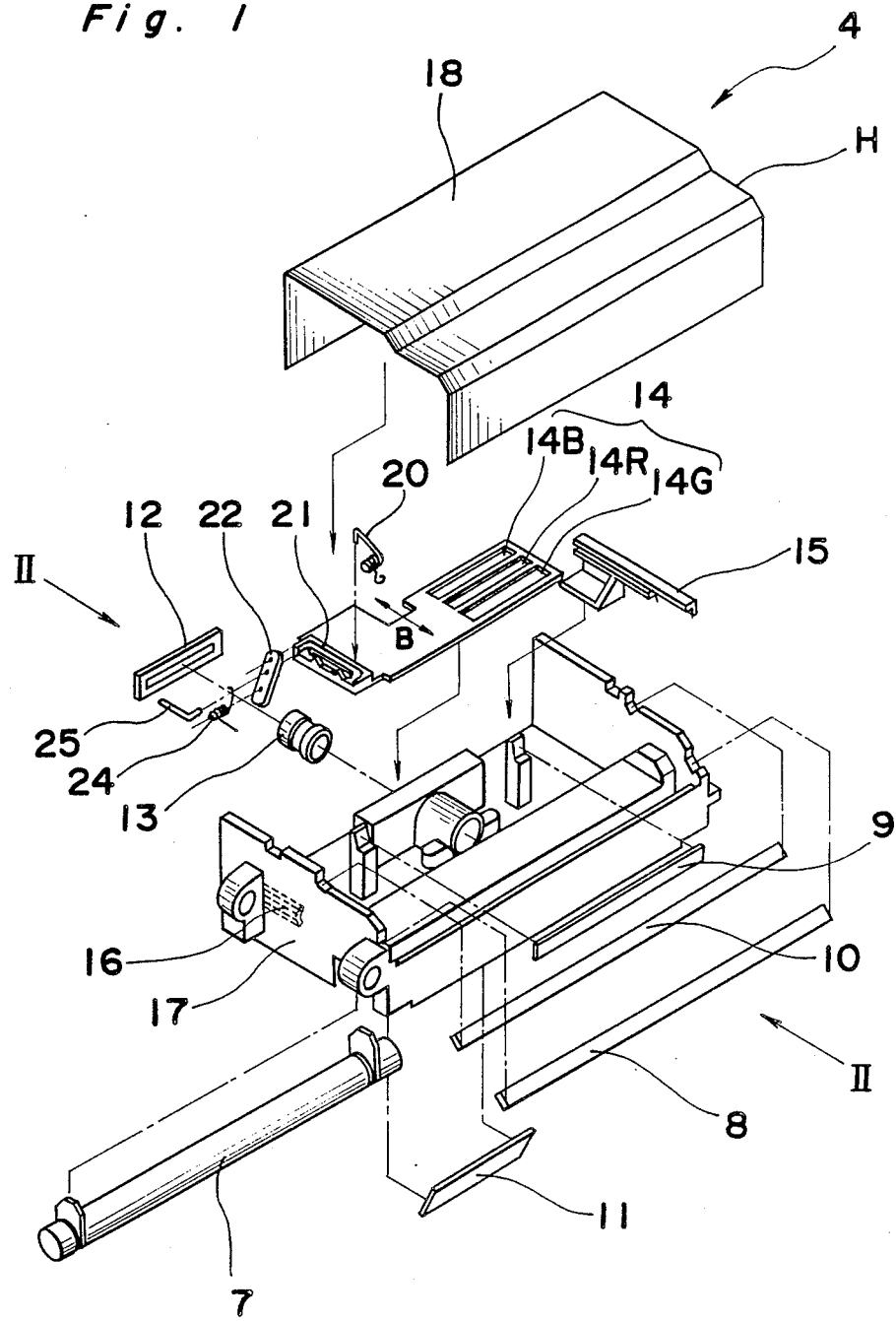
FIG. 1 is an exploded perspective view of an image reading unit to which a filter change-over mechanism, according to the present invention, may be applied.
Figure 2:
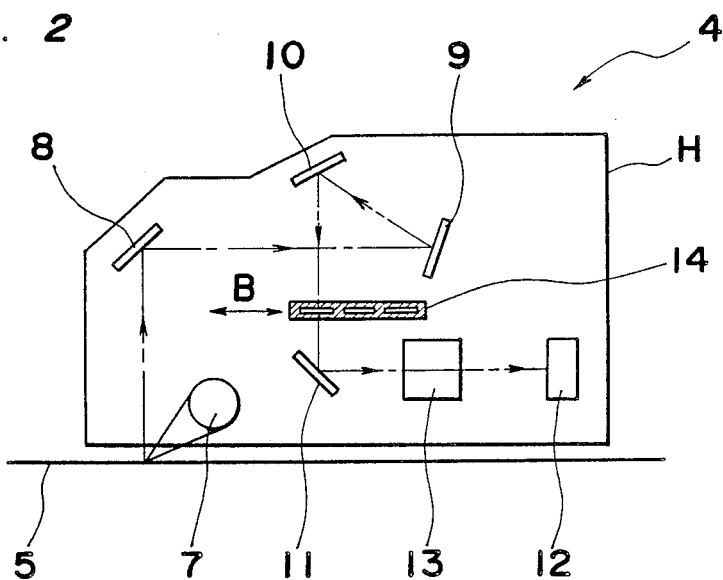
FIG. 2 is a schematic side sectional view taken along the line II—II of FIG. 1.

Referring also to FIGS. 1 and 2, the image reading unit 4 includes a housing H having an upper cabinet 18 and a lower cabinet 17, a light source of fluorescent lamp 7 for projecting light onto the original document 5; reflecting mirrors 8, 9, 10 and 11 for leading light reflected by the original document 5 to an image pick-up element, e.g., a solid state image pick-up element 12, through an image forming lens 13; and a filter panel 14 provided with filters 14R (red), 14G (green), and 14B (blue) in a plurality of colors and movably supported at its opposite ends in the housing H through guide members 15 and 16 for displacement in directions indicated by arrows in FIG. 1.

FIG. 2 shows a schematic cross section of the image reading unit 4 taken along the line II—II in FIG. 1. Light is projected from the light source 7 and reflected by the original document 5 and is led to the filter panel 14 through the reflecting mirrors 8, 9 and 10. The color separation of the light is effected as the filters 14G, 14R and 14B of the filter panel 14 are successively changed over in the directions of the arrows B, and thereafter, the light passing through the selected specific filter of the filter panel 14 is led to the image forming lens 13. Then the image is formed on the solid state image pick-up element 12.

Subsequently, the specific change-over mechanism for the filters the filter panel 14 as shown in FIGS. 1 and 2 will be described with reference to FIGS. 3A to 3C.

The filter panel 14 includes a filter positioning block 21 associated with a filter stopper spring 20. A filter driving arm 22 is pivotally connected to the filter panel 14 at its one end, and to the housing H at its other end for pivotal movement about a pin 23. A spring 24 is directed around the pin 23 for normally urging the filter panel 14 in the direction indicated by an arrow C through the arm 22. A shaft 25 extends laterally from an intermediate portion of the filter driving arm 22. By the contact of the shaft 25 with a contact member 26 provided on the apparatus main body 1a under the image reading unit 4, the filter panel 14 is displaced in the direction of the arrow F through rotation of the arm 22 about the pin 23. The filter stopper spring 20 is then successively guided, at its one end, over the filter positioning block 21 in a direction indicated by an arrow D.

The filter stopper spring 20 is displaced to the positioning points G, R and B for the respective filters (FIG. 3C-(a)) according to the degree of contact of the shaft 25 with the contact member 26. Thereafter, the filter of a specific color is selected then to be inserted into the optical path. More specifically, for selection of the filter 14G, the contact amount is of "0". When the filter 14R is to be selected, the shaft 25 may be brought into contact with the contact member 26 by the amount corresponding to the displacement of the filter stopper spring 20 from the point G to the point R. The filter 14B may be selected in the similar manner.

As described above, the respective filters 14G, 14R and 14B are successively changed over by varying the contact amount of the shaft 25 with the contact member 26 upon completion of each scanning. The filter panel 14 is positioned at the point G by causing the filter stopper spring 20 to pass the portion of the block 21 along the line IIIC-(b)—IIIC-(b) in FIG. 3B after completion of scanning of each filter in preparation for the subsequent image reading (FIG. 3C-(b)).

As is clear from the foregoing description, according to the filter change-over mechanism of the present invention, since a filters in the plurality of colors are changed over through utilization of the scanning function of the image reading unit, it becomes unnecessary to provide an exclusive driving source for filter change-over, and a complicated change-over mechanism, etc. Therefore, the image reading apparatus may be constructed to be compact in size and light in weight, and further the number of parts involved may be reduced.

Thus, a color image reading apparatus on the whole can be presented at low cost.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A filter change-over system in a color image reading apparatus, for use during scanning of an original document by said color image reading apparatus, said filter change-over system providing color separation of light from a light source reflected from said original document during said scanning, said system comprising:
   a contact member; and
   filter change-over means for sequentially subjecting each of a plurality of filters to said reflected light to provide said color separation, said filter change-over means including
      a filter panel with said plurality of filters disposed thereon at one end of said panel,
      an arm member pivotably connected to said filter panel, and
      a shaft member extending outwardly from said arm member,
      said shaft member, upon sequential contact with said contact member, pivoting said arm member, thereby laterally displacing said filter panel and thus sequentially subjecting each of said plurality of filters to said reflected light.

2. A system as claimed in claim 1, wherein said plurality of filters comprises three different color filters.

3. A system as claimed in claim 2, wherein said three different color filters comprise a red, a blue, and a green color filter.

4. A system as claimed in claim 1, wherein said filter change-over means further includes
   a filter stopper means for stopping said filter panel at a plurality of sequential stopping positions corresponding to said plurality of filters sequentially by contacting said filter panel upon the sequential contact of said shaft member with said contact member.

5. A system as claimed in claim 4, wherein said filter panel includes
   a filter positioning means defining said stopping positions disposed on said filter panel at an end opposite said plurality of filters for sequentially positioning each of said plurality of filters in the path of said reflected light upon sequential contact of said filter stopper means with said plurality of stopping positions.

6. A system as claimed in claim 5, wherein said plurality of filters comprises three different color filters.

7. A system as claimed in claim 6, wherein said three different color filters comprise a red, a blue, and a green color filter.

8. A system as claimed in claim 5, wherein said plurality of stopping positions are equal in number to said plurality of filters.

9. A method of subjecting a plurality of filters to reflected light, said reflected light being reflected from an original document during a scanning of said original document by an image reading apparatus, to thereby provide color separation of said reflected light, said method comprising the steps of:

(a) moving said image reading apparatus during said scanning of said original document;

(b) contacting a shaft member with a contact member, both said shaft member and said contact member being disposed in said image reading apparatus, upon said moving of said reading apparatus;

(c) pivoting an arm member attached to said shaft member upon said contacting of said shaft member with said contact member; and (d) laterally displacing a filter panel containing said plurality of filters and connected to said arm member upon said pivoting of said arm member, said lateral displacing of said filter panel subjecting one of said plurality of filters to said reflected light to provide color separation of said reflected light.

10. A method as claimed in claim 9, further comprising the steps of:

(e) repeating step b sequentially during said moving of said image reading apparatus; and (f) sequentially laterally displacing said filter panel upon said sequentially repeating step b, said sequential lateral displacing of said filter panel sequentially subjecting each of said plurality of filters to said reflected light to provide color separation of said reflected light.

11. A method as claimed in claim 10, wherein said plurality of color filters comprises a red filter, a green filter and a blue filter.

* * * * *